US011507541B2

(12) United States Patent
Jones

(10) Patent No.: US 11,507,541 B2
(45) Date of Patent: Nov. 22, 2022

(54) METHOD TO MODEL SERVER-CLIENT SYNC CONFLICTS USING VERSION TREES

(71) Applicant: MICROSOFT TECHNOLOGY LICENSING, LLC, Redmond, WA (US)

(72) Inventor: Brian Jones, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 198 days.

(21) Appl. No.: 16/748,388

(22) Filed: Jan. 21, 2020

(65) Prior Publication Data

US 2021/0224230 A1 Jul. 22, 2021

(51) Int. Cl.
*G06F 17/00* (2019.01)
*G06F 7/00* (2006.01)
*G06F 16/178* (2019.01)
*G06F 16/18* (2019.01)
*G06F 16/23* (2019.01)
*G06F 16/185* (2019.01)

(52) U.S. Cl.
CPC .......... *G06F 16/178* (2019.01); *G06F 16/185* (2019.01); *G06F 16/1873* (2019.01); *G06F 16/2365* (2019.01)

(58) Field of Classification Search
CPC ............... G06F 16/178; G06F 16/1873; G06F 16/2365; G06F 16/185
USPC ....................................................... 707/625
See application file for complete search history.

(56) References Cited

U.S. PATENT DOCUMENTS

| 5,806,078 | A | * | 9/1998 | Hug | ....................... G06F 40/197 715/205 |
| 7,529,199 | B1 | * | 5/2009 | Wijnands | ................ H04L 45/60 370/256 |
| 7,565,419 | B1 | | 7/2009 | Kwiatkowski et al. | |
| 7,568,195 | B2 | * | 7/2009 | Markley | ................... G06F 8/65 717/170 |

(Continued)

OTHER PUBLICATIONS

"Anonymous: "Concurrent Versions System"", Retrieved from: URL:https://en.wikipedia.org/w/index.php?title=Concurrent_Versions_System&oldid=926470083, Nov. 16, 2019, pp. 1-4.

(Continued)

*Primary Examiner* — Pavan Mamillapalli
(74) *Attorney, Agent, or Firm* — NovoTechIP International PLLC

(57) ABSTRACT

A file server and a method of operating a file server where version identifiers for documents on the server are maintained as a branched tree. When a client computer attempts to sync up a new version of a file, it must upload the version identifier that it received when it synced down the file. The file server compares this version identifier to the numbers in its version tree for the file and may place the document in the correct place in the tree structure, which may not be as the "latest version" of the document. If the client is using an outdated version of the document, the server may also sync down the latest version of the file. The user may view the changes to the version tree and reconcile different versions to create an authoritative version, and this review and reconciliation may occur at any time, instead of being performed at the moment that the file is saved or forking the file into a new filename.

20 Claims, 19 Drawing Sheets

(56) References Cited

U.S. PATENT DOCUMENTS

| | | | |
|---|---|---|---|
| 7,668,379 B2 * | 2/2010 | Vienneau | G06T 11/60 345/619 |
| 7,822,711 B1 * | 10/2010 | Ranade | G06F 16/10 707/622 |
| 8,335,775 B1 | 12/2012 | Sedlar et al. | |
| 8,516,470 B1 * | 8/2013 | van Rietschote | H04L 67/1095 717/168 |
| 8,909,677 B1 * | 12/2014 | Aguilera | G06F 16/2246 707/797 |
| 9,471,304 B1 | 10/2016 | Fuchs | |
| 2003/0033328 A1 * | 2/2003 | Cha | G06F 16/2315 707/E17.007 |
| 2007/0299969 A1 * | 12/2007 | Kunitake | G06F 16/93 709/225 |
| 2008/0040385 A1 * | 2/2008 | Barrall | G06F 16/128 707/999.103 |
| 2008/0104141 A1 * | 5/2008 | McMahon | G06F 40/197 707/999.203 |
| 2012/0221538 A1 * | 8/2012 | Liedes | G06F 16/1873 707/704 |
| 2014/0258351 A1 | 9/2014 | Laron | |
| 2015/0120649 A1 * | 4/2015 | Nakadai | G06F 3/067 707/609 |
| 2016/0196289 A1 * | 7/2016 | Lafreniere | G06F 16/219 707/695 |
| 2016/0232158 A1 | 8/2016 | Glover | |
| 2017/0185574 A1 | 6/2017 | Fern et al. | |
| 2018/0113862 A1 | 4/2018 | Glover | |
| 2018/0189369 A1 | 7/2018 | Baek et al. | |

OTHER PUBLICATIONS

"International Search Report and Written Opinion Issued in PCT Application No. PCT/US20/064752", dated Apr. 8, 2021, 14 Pages.

Yip, et al., "Pastwatch: A Distributed Version Control System", In Proceedings of 3rd Symposium on Networked Systems Design & Implementation, May 8, 2006, pp. 381-394.

* cited by examiner

METHOD TO MODEL SERVER-CLIENT SYNC CONFLICTS USING VERSION TREES

TECHNICAL FIELD

The present application relates generally to file servers, and in particular to systems and methods for maintaining version numbers for file versions on a file server in a tree structure.

BACKGROUND

When multiple users may require access to the same computer files, files are generally stored on a file server. A user who wants to read or edit a file "syncs down" (or downloads) the file from the server. When the user edits the file, it is then "synced up" (or uploaded) back to the server, where it may then be accessible to other users of the server. File servers often maintain a record of changes to the file in the form of a version history, which may be updated with a new version number whenever a new version of the file is saved. The version number may permit users to access old versions of a file, for example to view changes or to revert to a previous version when unwanted changes are accidentally saved.

A common sync problem that occurs when multiple client computers (or "endpoints") attempt to sync content to a server is that more than one client may attempt to modify the same file without syncing to each other first. A common design for resolving this is to ensure that whatever content is current at the server is considered to be authoritative and then to use an Optimistic Concurrency model to allow client computers to modify it only when they first sync the authoritative copy. This design is usually implemented by using a version number (or "etag") that syncs with the content. Each time the server syncs the authoritative version down to a client it also provides an etag to be used as a reference later. When the client modifies the version it received from the server and wants to upload the modified version, it provides the etag along with the modified content. If the server's version has not changed yet (and thus its stored etag matches the etag provided by the client), it is known that the client is attempting to modify a file that is derived from the last authoritative version in the server, and thus a complete overwrite of the file with the newest version is allowed. The server will allow the client to upload and overwrite the file and it will then return a new etag to the client to represent this newest state of the file.

When a client tries to upload a modified version of the file, but the etag it provides is not the latest etag that the server maintains (because another endpoint modified the file ahead of this client and this client has not yet synced that version), an Optimistic Concurrency failure occurs. The client cannot overwrite the contents of the file at the server because it missed one or more generations/versions of the file. Thus the base for which its changes are made is considered to be outdated and any attempts to overwrite the file would result in loss of changes since the last time this client synced the file down.

The most common solution to the problem of dealing with syncing multiple versions of a file is for the client to download the current version of the outdated file from the server and then convert the modified version into a new file and upload it independently. This technique is commonly known as "forking" the file since the content splits, or forks, from being contained in one file to being contained in two (or more) independent files that then have no clear tie to each other. The simple/common solution for forking is to rename the local version of the file to a new name derived from the original and then upload it as if it was a completely independent file. The biggest disadvantages of this solution are the following:

The files are no longer tied together. There is nothing to logically or physically tie them.

Discoverability is often an issue. The user most likely modified a file and then when the modified contents upload, the file the user modified gets renamed automatically and a different version of the file replaces the file the user just modified. This process can be very confusing for users when it occurs in real-time.

This approach increases the number of files the user is syncing, therefore increasing the quota and disk space being consumed.

In a collaborative environment, forking may occur frequently as many people may be concurrently modifying file content and attempting to upload their latest versions of the file. This process may result in many files with no clear logical connection to one another.

Software designers have attempted to alleviate the described disadvantages using the following approaches:

The local version of the file may be deleted and only the master version of the file from the cloud remains. This approach may incur data loss, since changes the user made will be overwritten without user permission.

The local version may overwrite the cloud version. This approach is called "Last Writer Wins," and it breaks the model of Optimistic Concurrency. It may also incur data loss, especially in an environment which claims to employ Optimistic Concurrency as its strategy.

When an Optimistic Concurrency conflict occurs, stop syncing the file and ask the user for guidance on how to merge or whether to choose the server's version, the client's version, or both. While it does not incur the data loss of the other two approaches, this solution is problematic because it breaks the autonomous sync model and may result in severe latency and delays in syncing.

A need still exists for a method of updating files and maintaining file versions that will not lose file changes, multiply files on the server, or require immediate input to resolve conflicts.

SUMMARY

In one aspect, a file server configured to store multiple versions of a file includes a processor and machine-readable media including instructions. The instructions, when executed by the processor, cause it to maintain a version tree for the file, wherein the version tree identifies a designation of one version identifier as a current version of the file, to receive a client computer request to save the file, the client computer request including a changed version of the file and a version identifier sent by the file server when the client computer previously opened or saved the file, and, in response to the received client computer request to save the file, to store the changed version as a new child version of the file, to assign a new version identifier to the new child version of the file, to update the version tree to add the new version identifier and to indicate that the new child version of the file is a child of the version corresponding to the version identifier included in the client computer request to save the file, and to send to the client computer a confirmation that the file has been changed, wherein the confirmation includes the new version identifier.

In another aspect, a file server configured to store multiple versions of a file includes a processor and machine-readable media including instructions. The instructions, when executed by the processor, cause it to maintain a version tree for the file, wherein the version tree identifies a designation of one version as the current version of the file, to respond to a request from a client computer to open the file by returning the file and a version identifier corresponding to the current version of the file, to respond to a request from a client computer to save the file, the request to save the file including a version identifier previously received from the file server, by comparing the version identifier previously received from the file server with the version identifier corresponding to current version of the file, and if the version identifier previously received from the file server does not match the version identifier corresponding to current version of the file, responding to the request to the client computer by providing the version identifier corresponding to current version of the file, and accepting instructions from the client computer on saving the file.

In another aspect, a method of maintaining multiple versions of a file on a file server includes saving a version tree structure to non-volatile storage, receiving from a client computer a request to open the file, responding to the request to open the file by serving to the client computer a current version identifier and the version of the file corresponding to the current version identifier, receiving from a client computer a request to save the file, the request including a version of the file to be saved and a version identifier received from the file server, and responding to the request to save the file by saving the file on the file server as a child of the version identifier received from the client computer, creating a new version identifier and assigning it to correspond to the saved file, and sending an acknowledgement to the client computer including the new version identifier.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
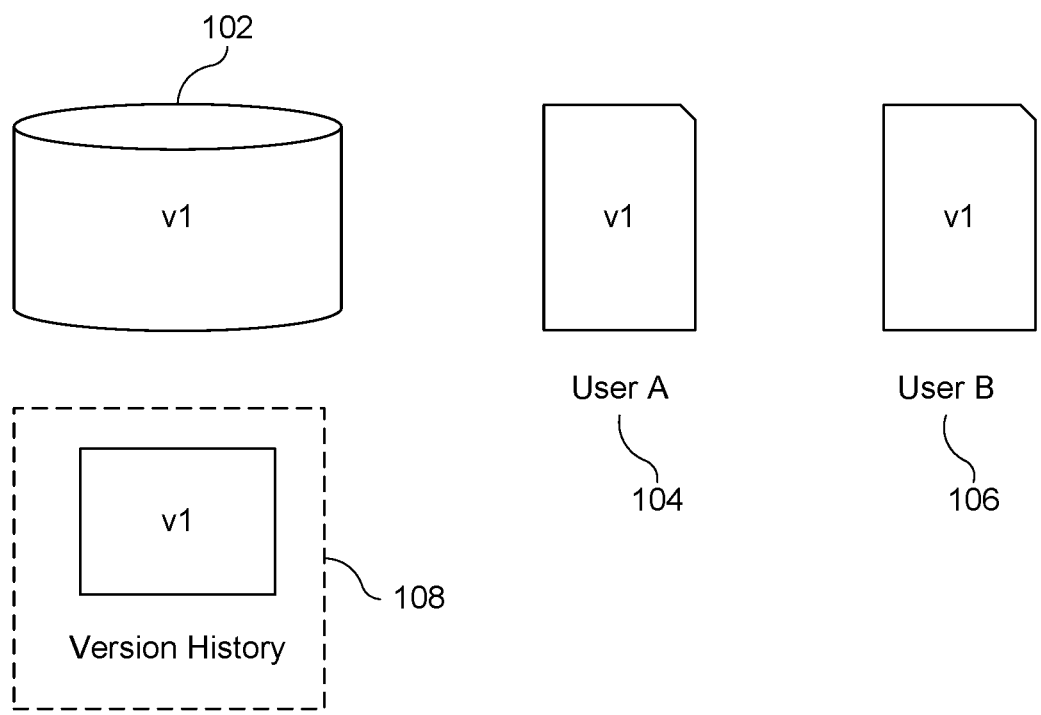
FIGS. 1a-1h show the evolution of a version tree as two users edit the same file.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

In currently available file server systems, when a user tries to sync up a file that is based on an "old" version, the file is required to "fork" into a new filename. This process can create a technical problem of difficult-to-resolve file names and user changes to the file, especially if users start saving files with new names that are not part of the version history. User changes may be lost, even if all of them appear somewhere on the server, if the person who reconciles the versions misses a new file name or an edit. The present disclosure provides a technical solution: instead of a linear list of file versions, versions are stored as a tree. When a user tries to sync up a file that is based on an "old" version, the file may be saved as a branch off that version, and the most current version is synced down to the user. This solution provides the benefit that a user can later view the entire version structure and figure out how to resolve different changes to create an authoritative version of the file. This resolution does not have to happen at the same time that the user is editing the file and does not even need to be performed by the same user who created the branched versions.

In one implementation, a "tree," as that term is used herein in connection with version trees, includes any file structure which can be used to save a directed graph including one or more nodes linked in a hierarchical arrangement, in which each node has no more than one parent node and an arbitrary number of child nodes, and there is a single root node which has no parent of its own. A particular instance of the file structure may be linear (an unbranched tree), as long as the data structure is capable of storing a branched tree.

A straightforward solution to the problem of users saving out-of-sync files would be to merge the local changes into the most up-to-date version of the file that the server maintains. This would involve syncing down the latest version and its etag and running a merge function that would take the local content and apply it to the up-to-date version. Depending on file/content type, automated merge algorithms can be considerably complicated. While it may be possible to create merge "engines" that adequately deal with text-based content (although even this simple form of content can be problematic in some circumstances), binary content such as images is much more difficult to merge automatically. Even though text-based merging is theoretically possible, few real, lossless solutions exist.

In most cases the lack of adequate merge engines means that alternatives to merging must occur. This disclosure proposes an alternative to directly merging file versions that are in conflict with one another given the Optimistic Concurrency model described above, by changing version history for file changes from a linear model into a tree model. With this change, normal updates from the server will always continue to linearly progress from one version to the next. The only time the tree will branch is when a client detects an Optimistic Concurrency failure and needs to handle it without the ability to merge. Instead of forking the file, the client will upload the local version as a branch from the last version it knew about using its stored etag as the identifier.

FIGS. 1a-1h show a document being edited by two users in a system where the server controls versioning. As shown in FIG. 1a, server 102 stores a file which is being edited by user A 104 and user B 106. Version history 108 is also stored on server 102. As illustrated, the document has not been edited yet, so both user A and user B are working on a version denoted as v1. It will be understood that illustrated version numbers have been chosen for clarity of understanding, and that the details of version numbering may differ in different implementations. In particular, while the phrase "version number" is used in the description below, some implementations may use nonnumeric version identifiers. In some implementations, version numbers may include partial or full information about the version history (for example, v1.1 may represent a branch from v1), while in other implementations, version numbers may be simple identifiers without encoding tree information. Version trees may be stored in any suitable data structure, such as a linked list. The file server preferably stores the version tree in non-volatile storage that persists even during a loss of power, such as by saving it to magnetic storage media or to persistent memory such as flash memory. As shown in FIG. 1a, since no changed versions have been created yet, v1 is the sole, root node of the version tree.

Figure 1B:
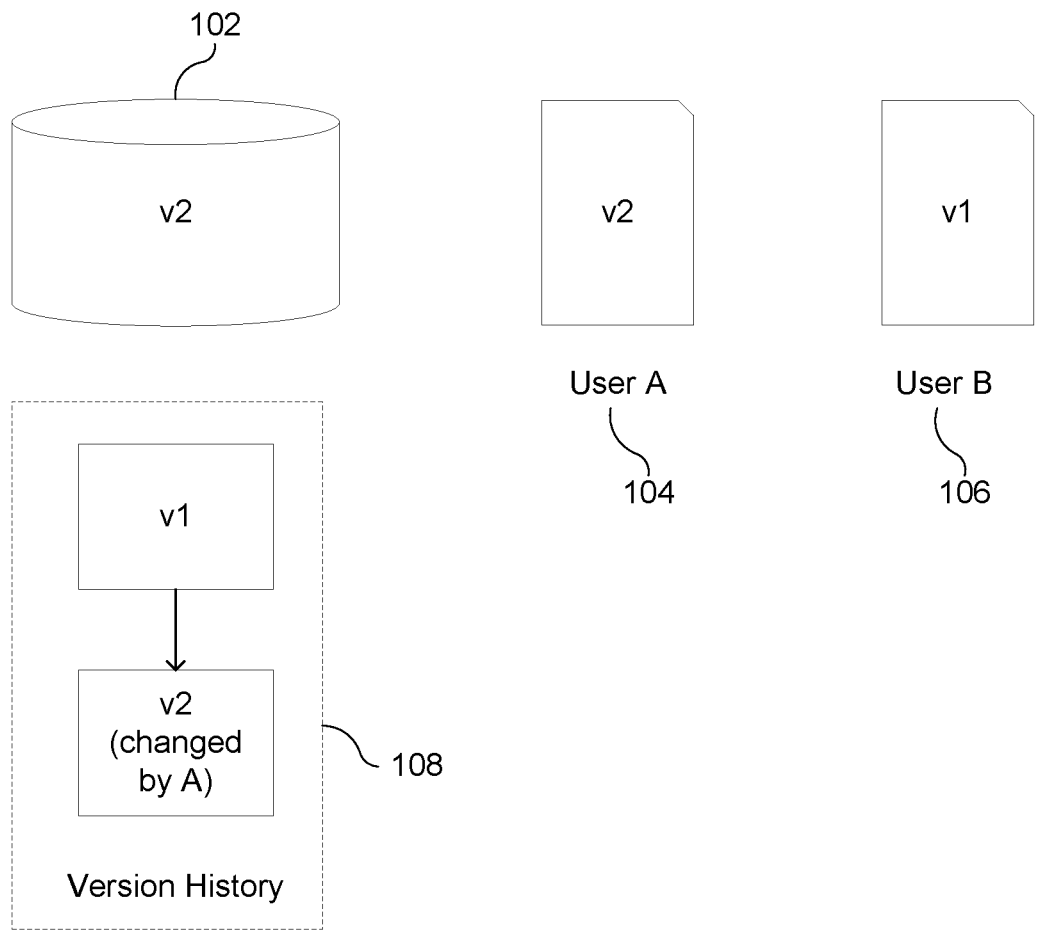

FIG. 1b shows the state of the file at the two user endpoints and at the server after user A 104 and user B 106 each try to save changes to the file. Server 102 receives user A's save first. It stores the new version of the document as v2 and communicates the new version number back to user A 104 with a confirmation that the document has been successfully saved. Version history 108 now contains two nodes, the original v1 and the new version v2. In the illustrated implementation, the server also stores the information that user A was the one who created version v2. The new version has not yet been pushed to user B, who is still using v1.

Figure 1C:
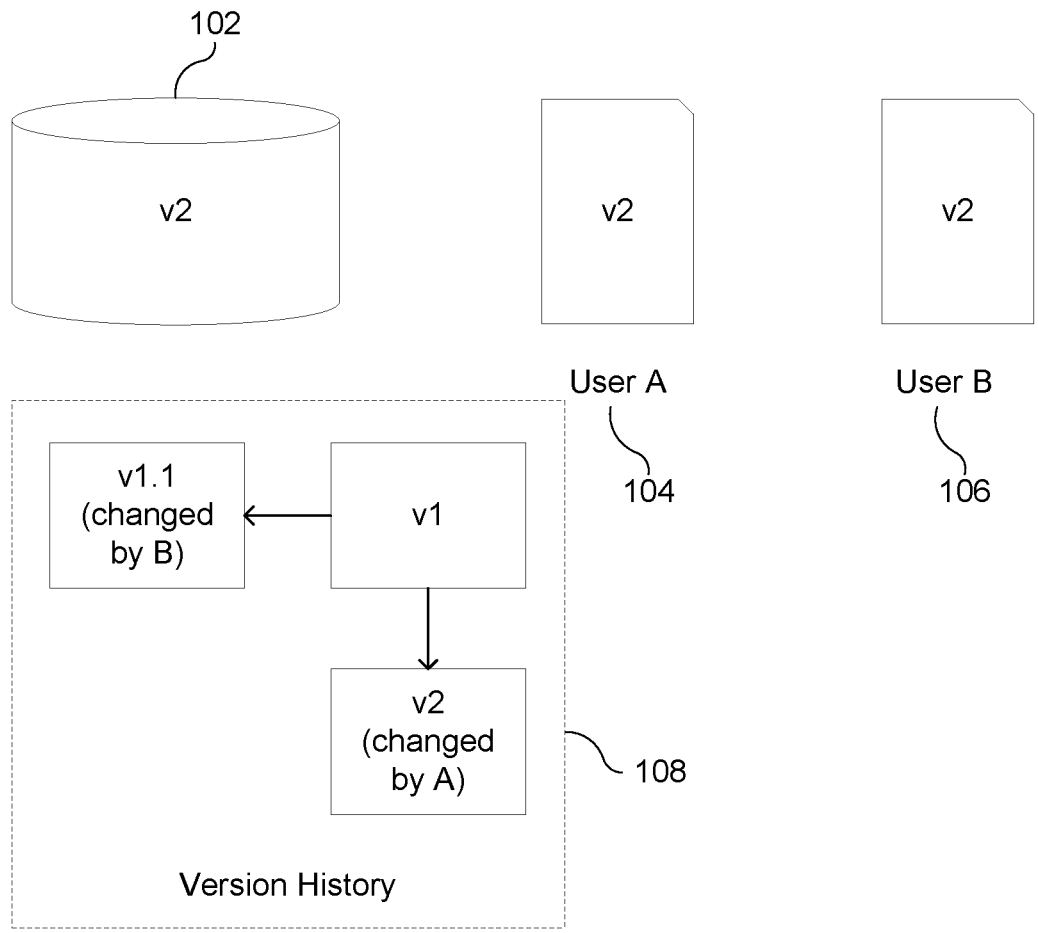
Figure 1D:
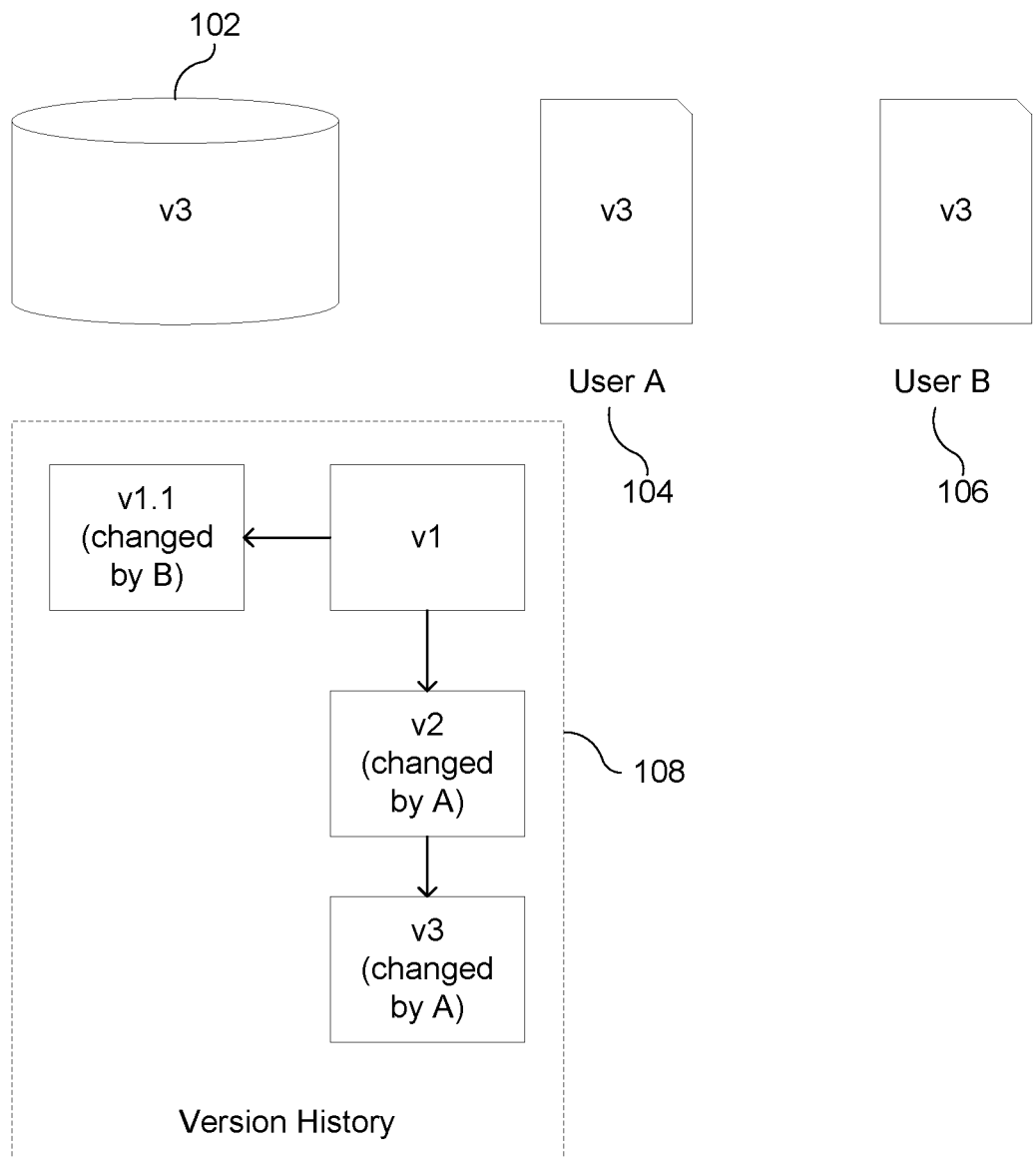

FIG. 1c shows the state of the file after user B's save request arrives. Server 102 does not save user B's edits as v3, because user B is still basing edits on v1, not v2. Instead, server 102 creates a branch in the version history 108 and saves user B's edits as v1.1. It then communicates to user B 106 that the save was based on an old version. It presents a user interface (further described below in FIG. 4) to user B communicating the conflict and allowing user B to decide what to do with the conflicting file. By default, the most current version stays as v2 as shown, and v2 is downloaded to user B 106. User A 104 then makes another edit to the file, and server 102 saves it as v3. The state of the file and the version history after this edit is shown in FIG. 1d. The new version v3 is also synced down to user B 106, so both users have the same version again (which is also the most current version of the file).

Figure 1E:
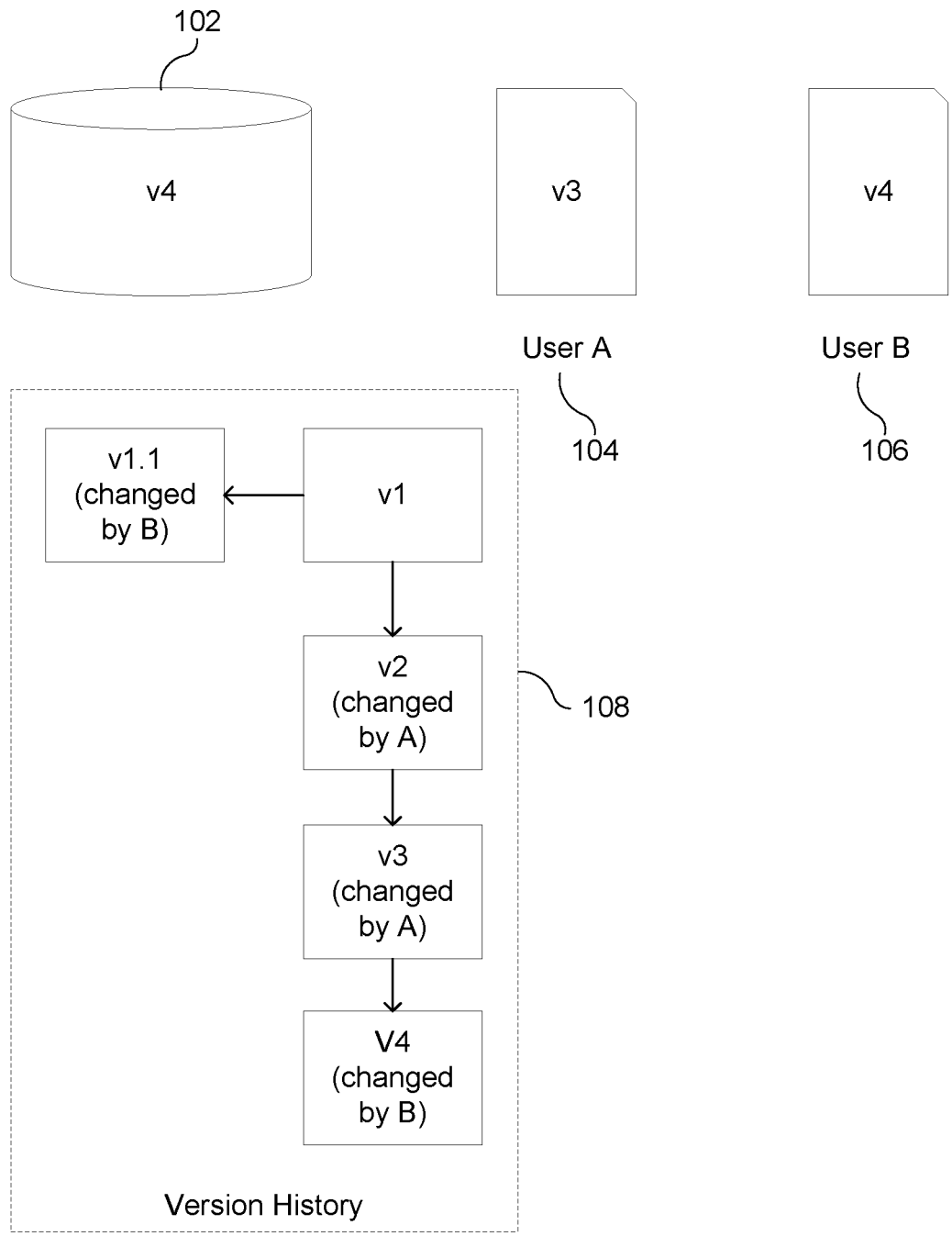

User B 106 continues to edit the file and saves their changes. Since they have the current version (v3), server 102 saves their changes as v4, as shown in FIG. 1e. User A 104 also attempts to save changes at the same time, but this time server 102 rejects because user A is still using v3 and the server is on v4. Instead, it branches the changes as it did with user B in FIG. 1c. The new branch is shown in the version history 108 in FIG. 1f as v3.1. As it did with user B 106 for version 1.1 in FIG. 1c, server 102 offers user A 104 a user interface to choose what to do with the branched file. It also downloads v4 to user A. User A decides to elevate v3.1 to become the most current version of the file. Server 102 then syncs down v3.1 to both user A 104 and user 106, as seen in FIG. 1g. User A then makes further edits to the file, and it is updated to v5, as seen in FIG. 1h. Note that as illustrated, v5 branches from v3.1, not from v4. The changes to v5 are synced down to both user A 104 and user B 106, as shown in FIG. 1h.

Figure 1F:
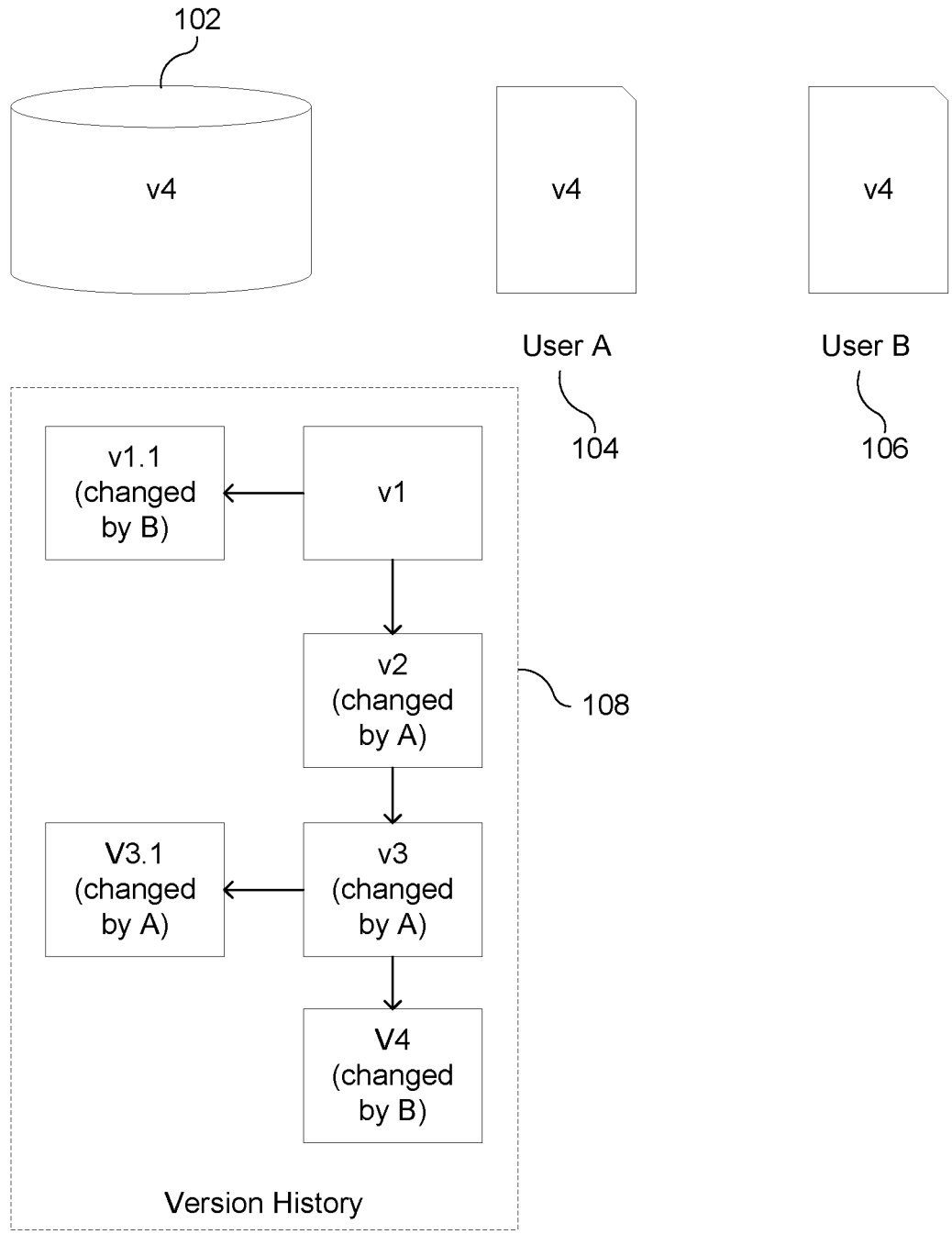
Figure 1G:
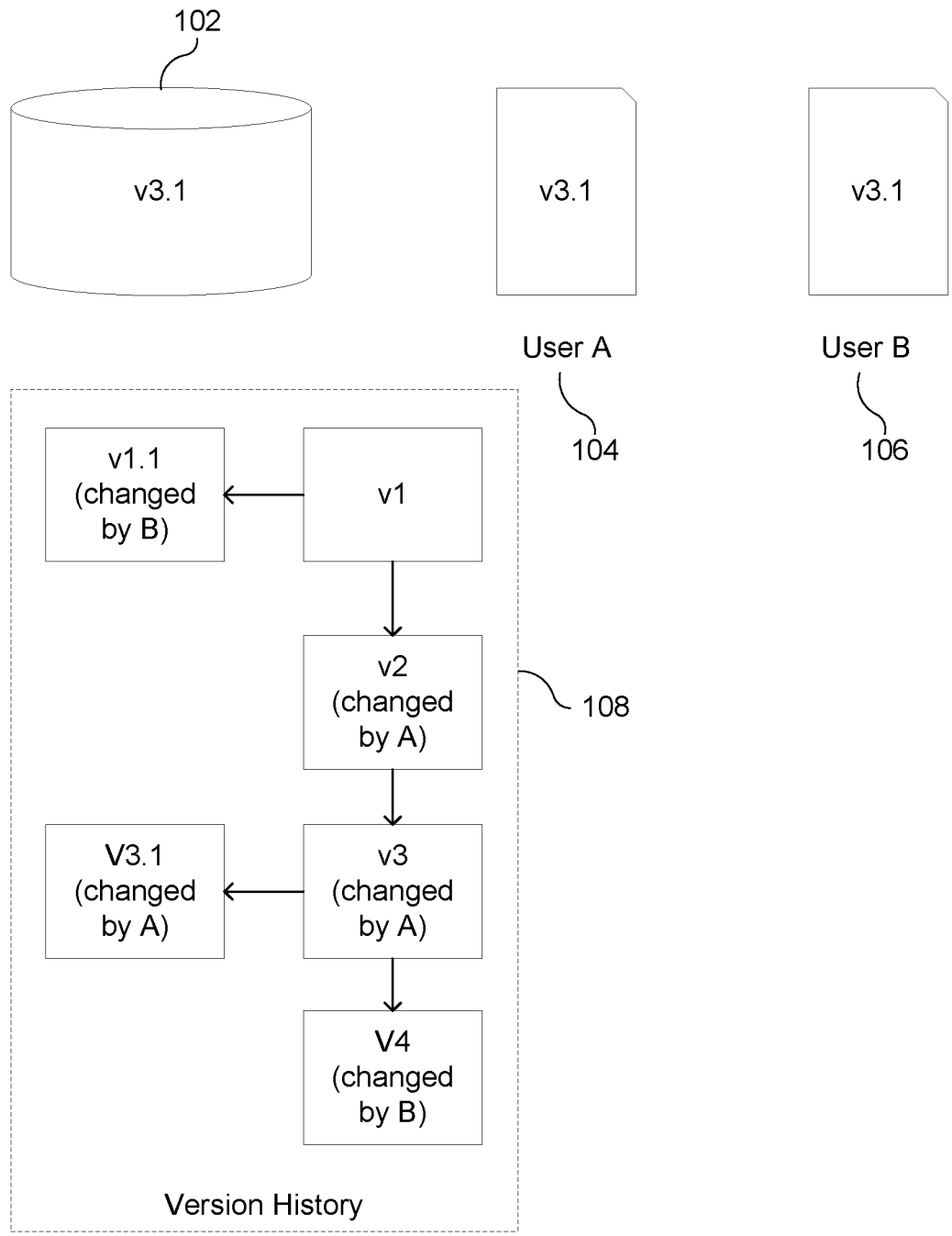
Figure 1H:
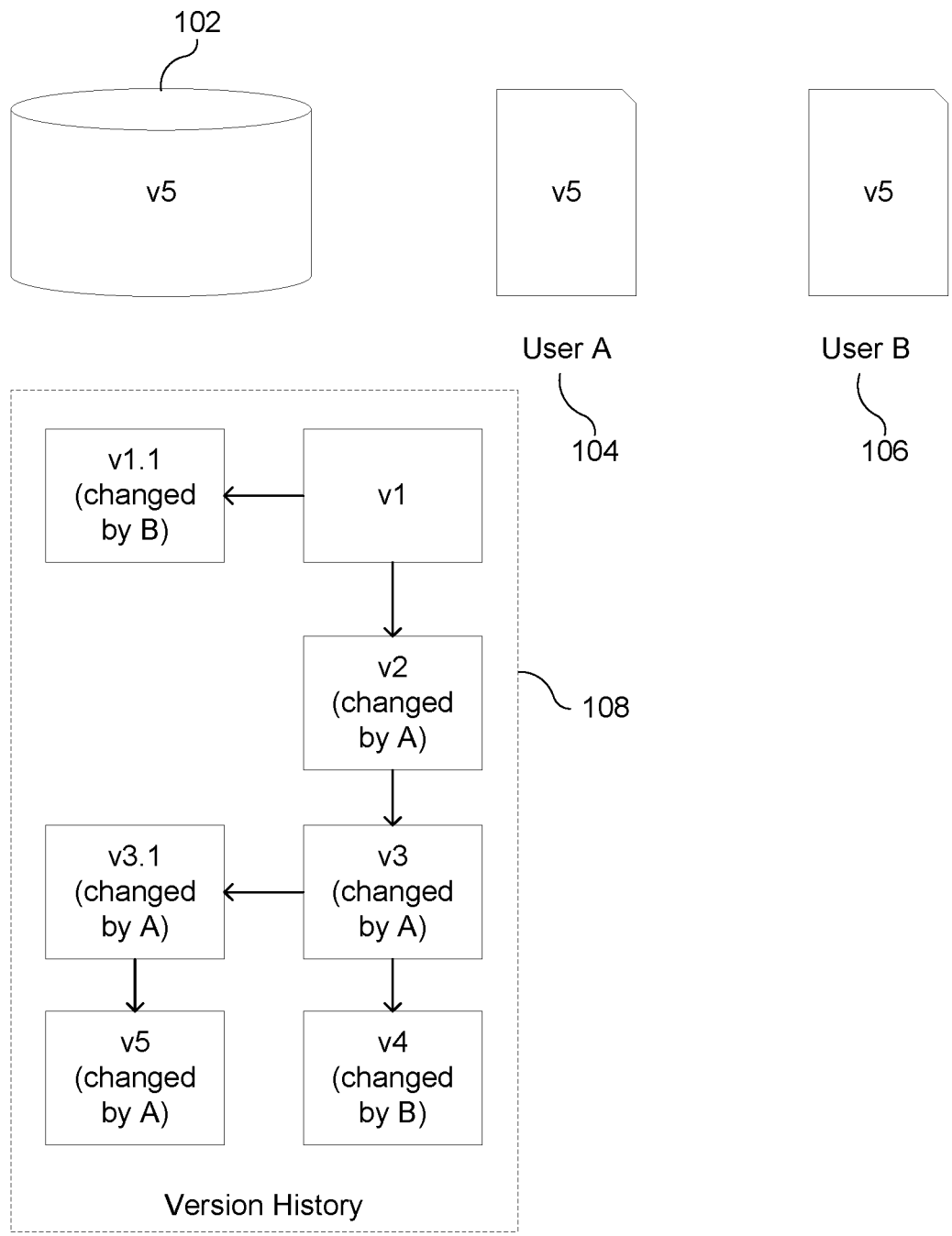

Note that it would also be possible for user A to decide instead at FIG. 1f to save as a new file (to fork the file) (not illustrated in FIGS. 1a-1h). In this case, instead of saving as v3.1, user A would be prompted to provide a new file name (or the server would generate one from the existing file name), and the changes would be saved as the root node v1 of a new version tree for the new file. This process is further discussed below in connection with FIG. 4 and FIG. 5.

It will be understood that the sequence of file versions shown in FIGS. 1a-1h is shown with only two users for purposes of clarity, but that a similar set of version changes could involve more users. Server 102 is responsible for assigning version numbers and maintaining an accurate version tree. It will be noted that at several points in the above description, server 102 downloaded updated versions of the file to user A 104 and/or user B 106 (e.g., FIG. 1c, FIG. 1d, FIG. 1f, FIG. 1g, FIG. 1h), while in FIG. 1b and FIG. 1e, the updated version had not already been pushed to user B or user A, respectively. In these latter cases, the users with outdated versions were in the middle of editing the file, so it had not yet been updated with a new version from the server, in order to avoid losing changes still in process. In the other figures, the users were not in the middle of making conflicting edits, so the new versions of the file could be sent to their computers without interrupting their work. In the illustrated implementation, user A and user B are both subscribed to the subject file (or possibly to a folder containing it), so that server 102 sends notifications to each of them each time a new version is saved. In some implementations, this notification may not contain the actual changes, but simply a notification that there has been a change involving the file. In such implementations, the user's clients are responsible for requesting a change enumeration when appropriate to maintain the most current version of the file. Copending and commonly owned U.S. patent application Ser. No. 15/199,266, incorporated by reference herein to the extent not inconsistent herewith, describes other methods of preventing the need to fork files, by placing a file in a hold state while it is open for editing.

Figure 2A:
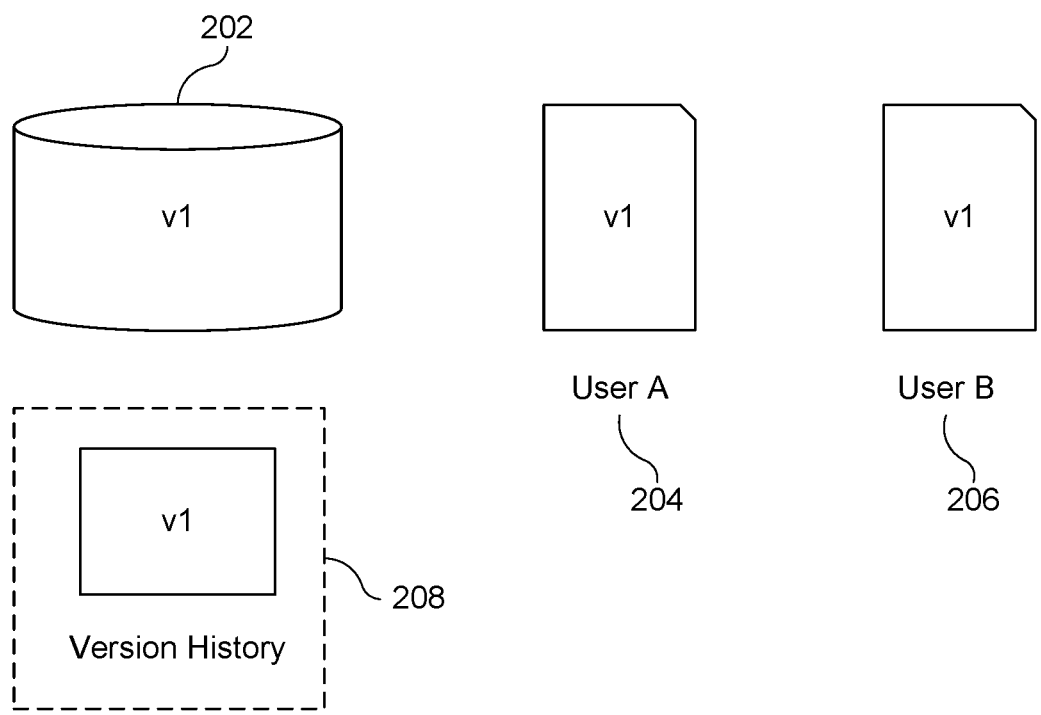
FIGS. 2a-2e show the evolution of a version tree for a file being edited by two users with client control of branching enabled for one of them.

FIGS. 2a-2e show a similar sequence of evolution of a file, this time in an environment where client computers may have more direct control of versioning. In this sequence, server 202 stores the file and the version history, user A 204 has a version branching feature enabled, and user B 206 has version branching disabled. As shown in FIG. 2a, server 202, user A 204, and user B 206 all have the same, original version of the file, enumerated as v1 in version tree 208. User A and user B both begin editing the file.

Figure 2B:
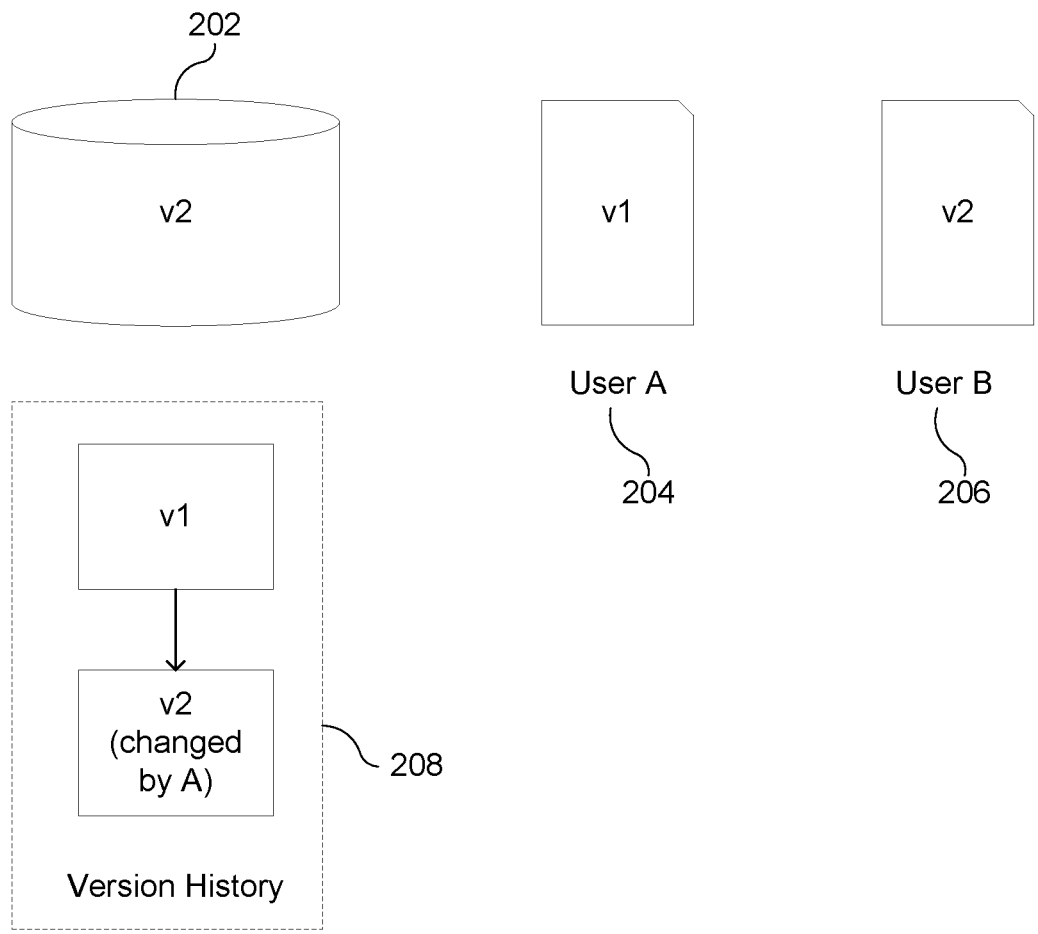
Figure 2C:
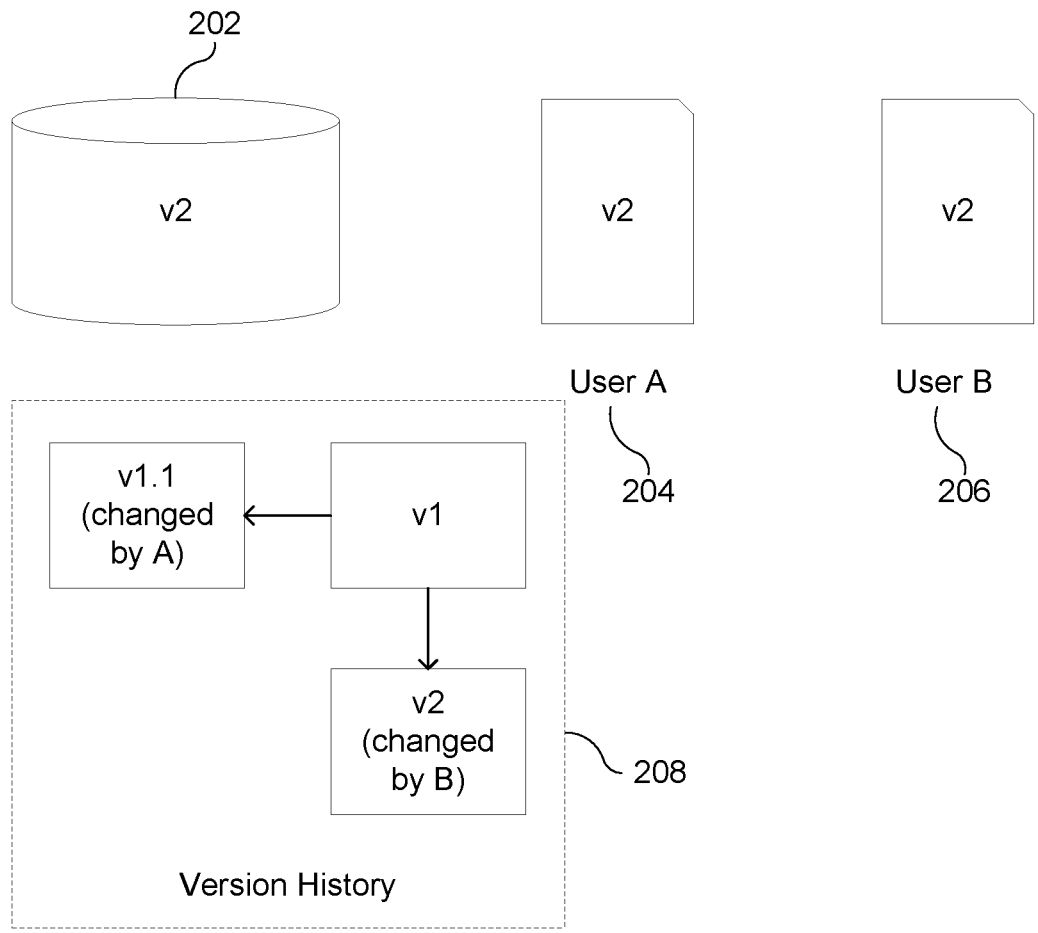

FIG. 2b shows that user B 206 has saved edits to the file, now enumerated as v2. User A 204 has not yet updated to v2 and continues to edit v1. When user A attempts to upload changes to the file, the change is rejected because user A is still working on v1, but the current version at the server is v2. Because user A's computer is running with the version history branching feature turned on, it sends a request to server 202 to directly add its edited file as a version of v1, shown in FIG. 2c as v1.1 in version tree 208. Once this completes, user A requests v2 of the file, also seen in FIG. 2c. A user interface is presented to user A to allow them to decide (at any time) whether to elevate v1.1 to the most current version or to continue working with v2.

Figure 2D:
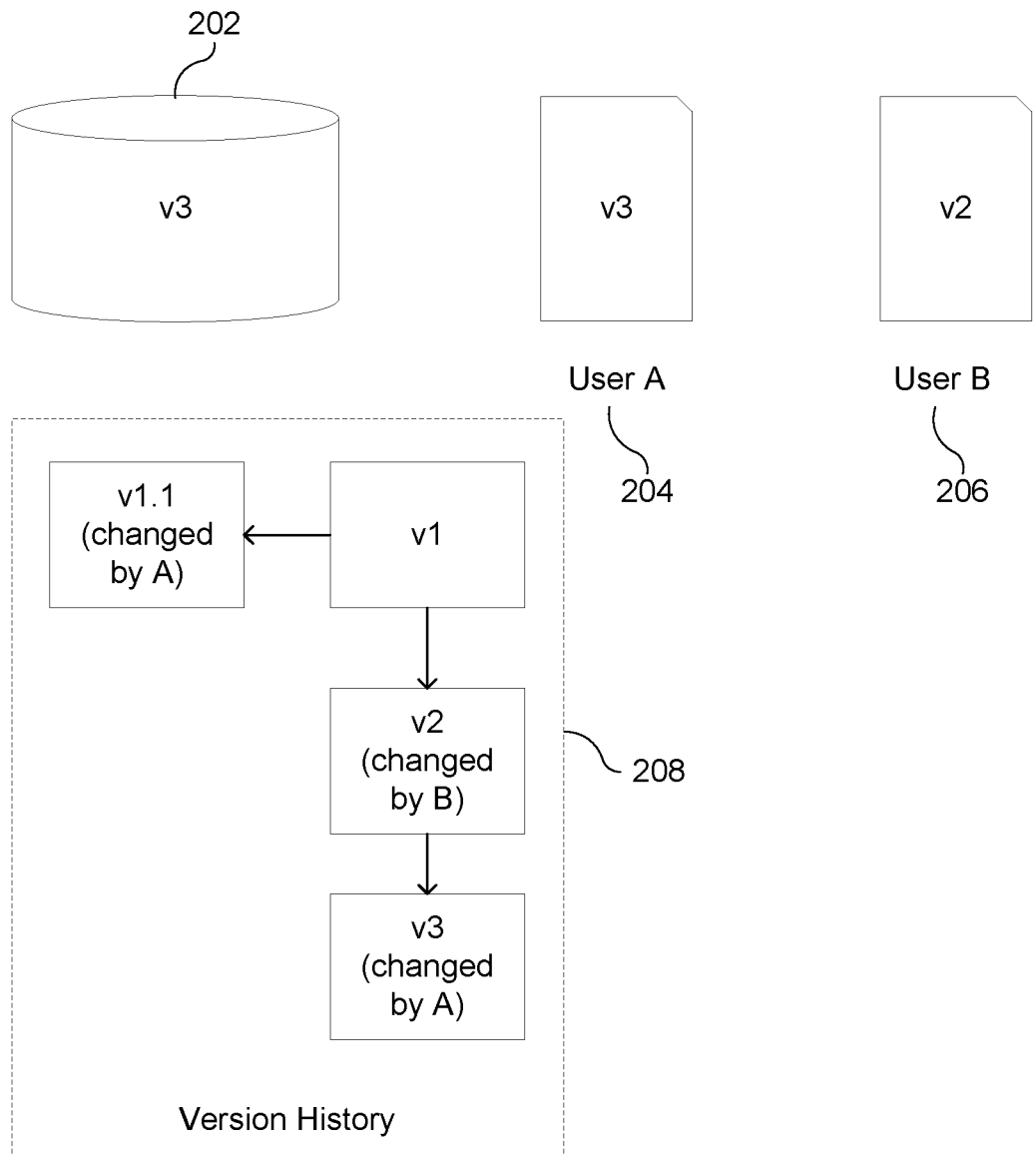
Figure 2E:
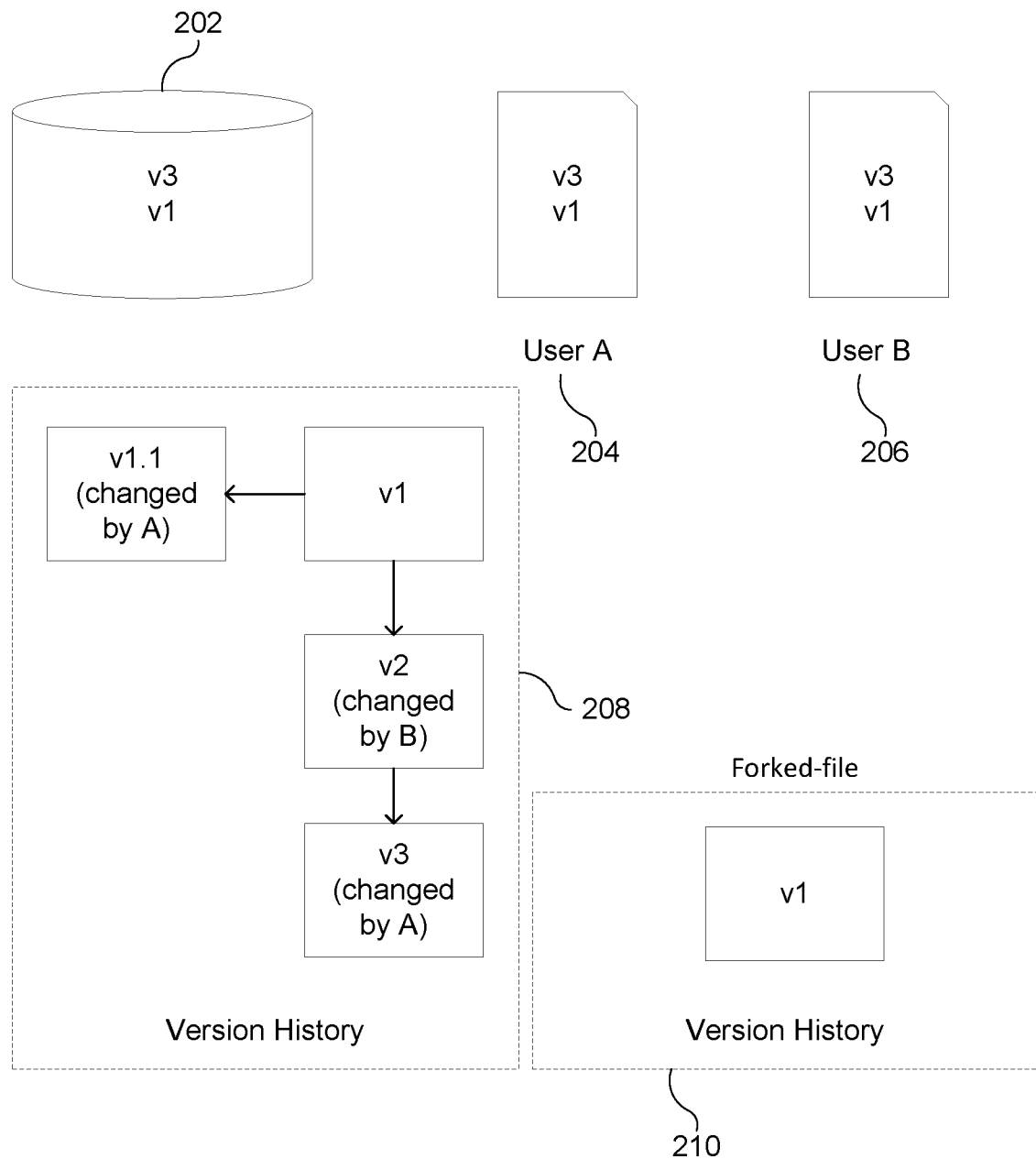

FIG. 2d shows that user A 204 has now edited v2 and saved changes to the file as v3, but user B is still working with v2. User B 206 then attempts to save their changes, but they are rejected because user B is still working on v2, but the current version on the server 202 is v3. User B's client is not running with the version history branching feature turned on (the user turned it off) so these changes are uploaded as a new (forked) file automatically, seen in FIG. 2e. User B's client then downloads v3 and updates the file. As seen in FIG. 2e, server 202, user A 204 and user B 206 all have version v3 of the original file and version v1 of the new, forked file 210. (User A obtained the new version of the forked file because their subscription to changes in the original file also notified them of the fork.)

Figure 3:
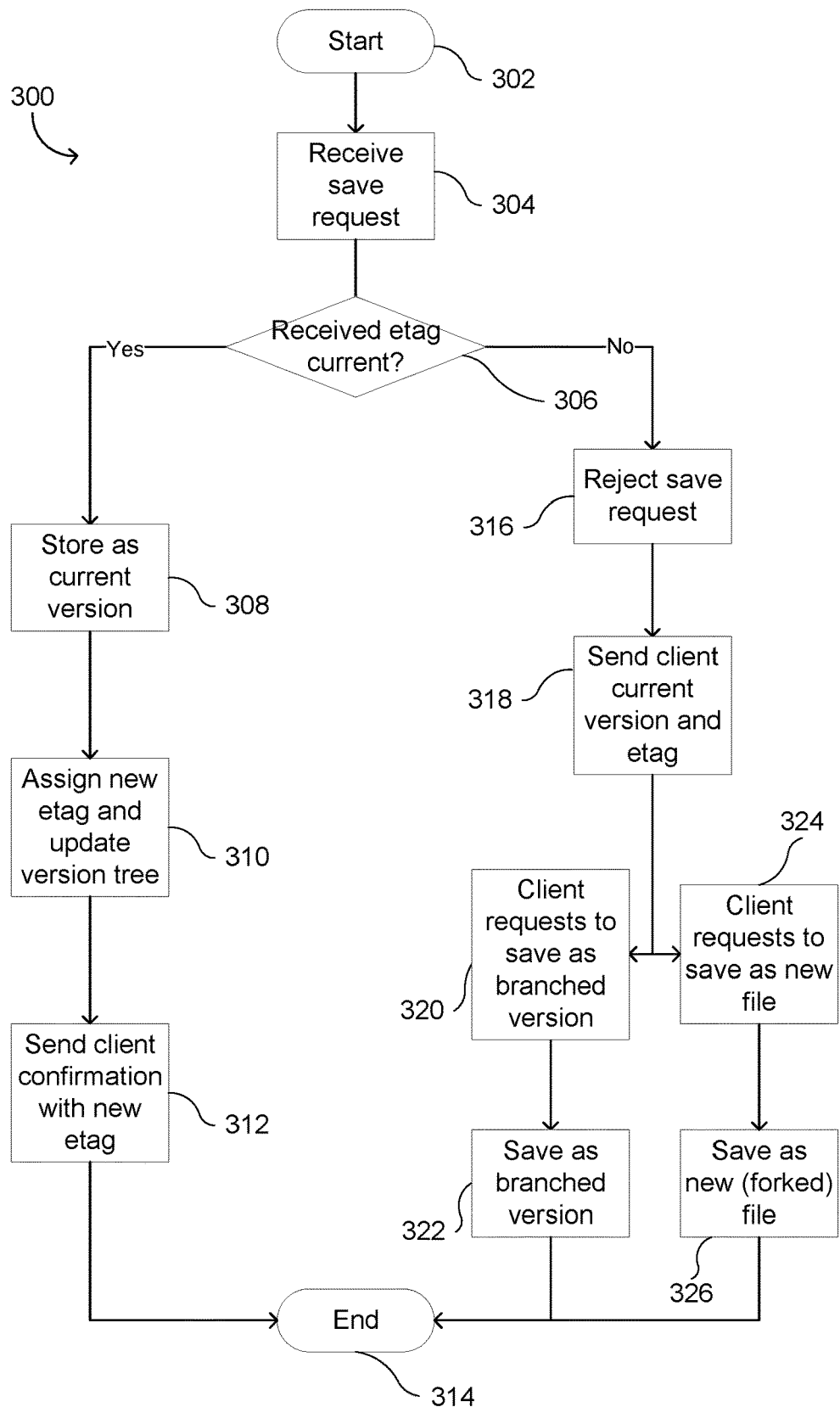
FIG. 3 is a flow diagram showing steps of creation of a version tree.

FIG. 3 is a flow diagram 300 describing steps that a file server (such as server 202) takes when receiving a save request from a client (such as user A 204 or user B 206). It is presumed that prior to start 302, a client has opened (or created) an original file with only one etag, v1. The file server receives a save request from the client (step 304). As discussed above, the save request includes the etag that the client received from the server when it last synced down the file. The file server compares the received etag with its own saved current version of the file (step 306). If the versions match, it stores the changed file as the newest version (step 308), assigns the newest version a new etag (step 310), sends the client a confirmation that the file has been changed with the new etag (step 312), and the process ends (step 314).

If the versions do not match, it means that the client has been working with an out-of-date file. The server initially rejects the save request (step 316) and informs the client that its version is out-of-date. It downloads the current version and etag to the client (step 318). The client may request to save the file (step 320) as a version branched from the out-of-date version that the client provided with the save request in step 304. In response, the server saves the changes to the file as a branch from the version that the client was previously working with and assigns a new etag (step 322), and then the process ends (step 314). Alternatively, the client may request that the file be saved as a new file with its own version tree (step 324). In response, the server saves the changed file as a new (forked) file with a new root etag (step 326), and the process ends (step 314). In some implementations, the server may maintain a connection between the original file and the forked file, while in other implementations, the server does not store information about their relationship. In either case, the user of the client is notified that branching or forking has occurred, so that the different versions may be reconciled later.

Figure 4:
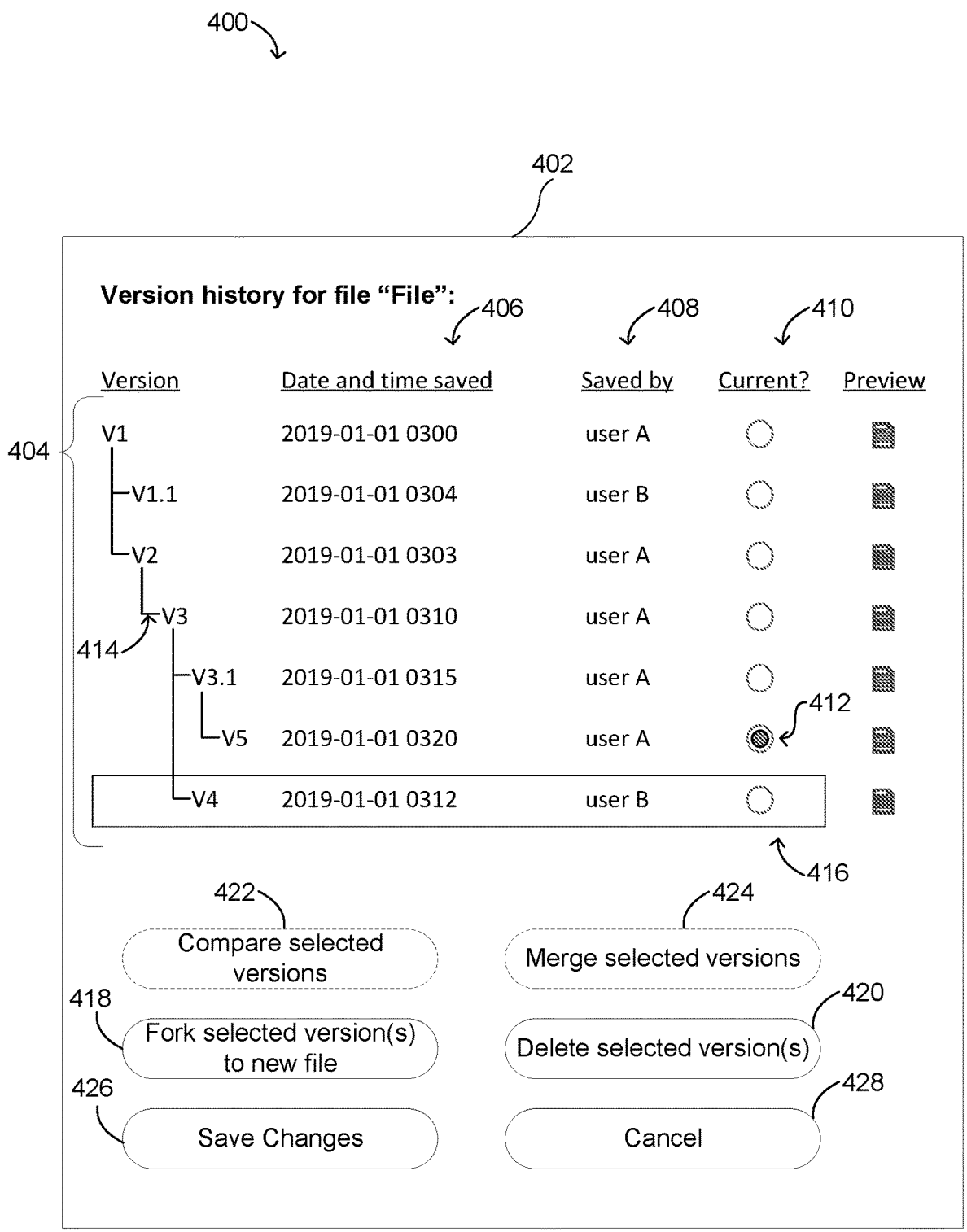
FIG. 4 is a user interface for examining a version tree.

FIG. 4 shows a possible user interface (UI) 400 for viewing the version tree of a file. This UI may appear when a user is requested to resolve a conflict, as discussed above in connection with FIG. 1c and FIG. 1g, or it may be entered by a user at any convenient time when they wish to work with or resolve old versions of the file. Window 402 shows the version history for all versions of the file in a tree format. Text block 404 shows a line for each version of the file shown in FIGS. 1a-1h above, along with a date and time saved 406, the user who saved that version 408, and a set of radio buttons 410 indicating which version is considered to be the current version (as illustrated, "v5" 412). The tree structure is indicated by lines 414. A user can use the UI to select one or more particular versions from the list, as described in more detail below. As shown in FIG. 4, version "v4" is selected, as indicated by selection box 416.

Details of version save times and users are drawn from the description of FIGS. 1a-1h above, which is incorporated by reference into this description. For example, user A and user B both tried to save edits to v1 at close to the same time (shown as times 0303 and 0304, respectively). Since user A's save request arrived first, v2 was created at 0303, while user B's save request was saved as version v1.1, branched from parent v1 instead of from v2 that was the most current version at the time that user B saved.

Window 402 also contains a number of controls for actions that a user might wish to take while viewing the version tree. As mentioned above, the user may select one or more versions from the list in order to perform these actions. The user may change which version is considered to be current by means of radio buttons 410. For example, as described above in connection with FIG. 1g, user A made v3.1 the current version, instead of then-extant v4, and subsequently saved v5 as a branch off of v4 as shown in FIG. 1h.

Figure 5:
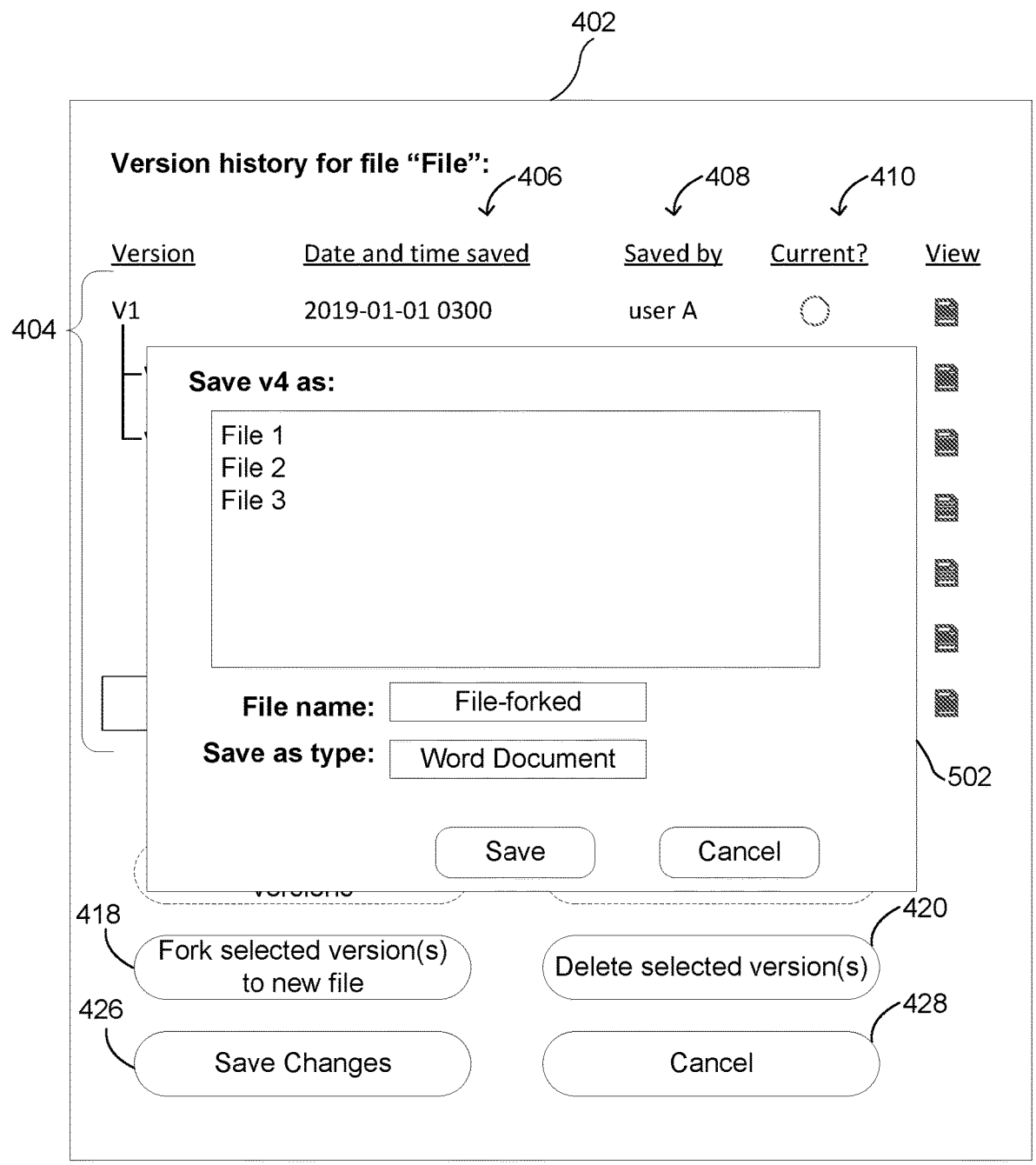
FIG. 5 shows a dialog box for forking a file from the version tree of FIG. 4.

Control 418 labeled "fork selected version(s) to new file" allows a user interacting with UI 400 to create a new file with a one-node version tree based on one of the listed file versions, as illustrated in FIG. 5. As can be seen in that figure, when the user clicks on control 418 while v4 is selected, dialog box 502 appears giving the user the option to save that version with a default filename of "File-forked." The user may edit this default filename or save the file as a different file type by means of standard editable boxes. The dialog box 502 includes controls for "Save" to save the file with the selected type, or "Cancel" to cancel the save operation. As saved, the new file may be completely independent of the old file and its associated version tree, or it may contain information such as a pointer to the old file or an indication of which version number it was before it was copied (or deleted) from the old tree. In some implementations, selecting this option also deletes the version from the version tree, while in other implementations, selecting this option simply copies the version into a new file.

Figure 6:
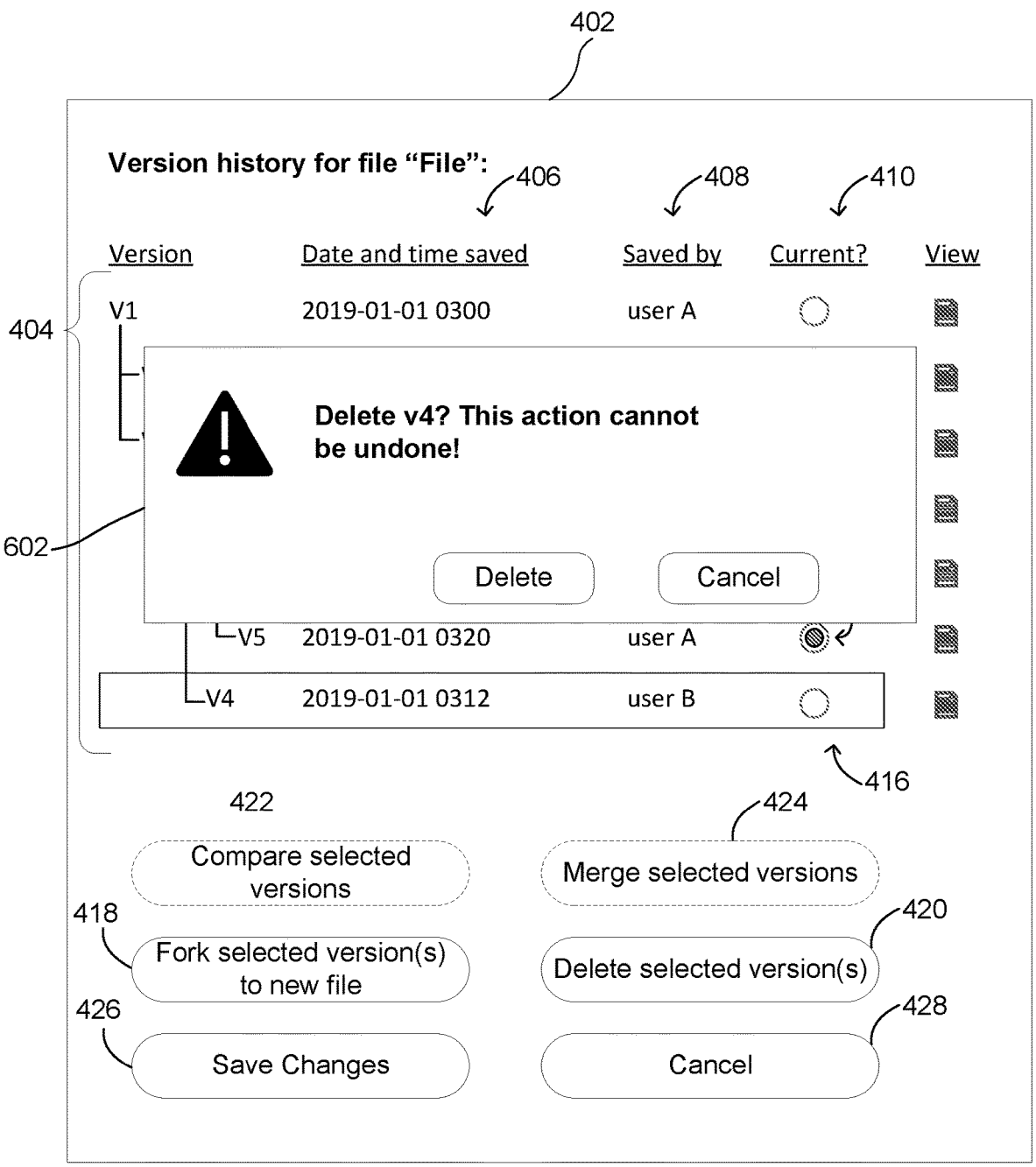
FIG. 6 shows a dialog box for deleting a version from the version tree of FIG. 4.

Control 420 labeled "Delete selected version(s)" permits the user to delete or purge one or more versions of the file, as illustrated in FIG. 6. As can be seen in that figure, when the user clicks on control 420 while v4 is selected, dialog box 602 appears giving the user the option to delete that version from the file server. As illustrated, dialog box 602 includes a warning icon and a message that deleting the file version cannot be undone and allows the user to either select "Delete" to purge the version, or "Cancel" to keep it. It will be understood that in some implementations, the purged version may nevertheless be saved for at least a short period of time rather than irretrievably deleted.

Control 422 labeled "Compare selected versions" is illustrated as "grayed out" in FIG. 4, because only one version has been selected. In another view where multiple versions have been selected (not shown), this control may enable a user to access a "compare documents" tool, if one is available. Such tools are available in a variety of applications, such as Microsoft Office®. This type of comparison may be useful, for example, if the user is trying to manually resolve conflicts in different versions. As discussed above, comparison tools are relatively easy to implement for text-based files but may be more difficult for images or drawing files. In some implementations, if no comparison engine is available for the selected file types, control 422 remains "grayed out" even though multiple versions have been selected in window 402.

Similarly, control 424 labeled "Merge selected versions" is illustrated as "grayed out" in FIG. 4, because only one version has been selected. In another view where multiple versions have been selected (not shown), this control may enable a user to access a "merge documents" tool, if one is available. Such tools may be available for text-based applications, but as discussed above, they are more difficult to implement for images or drawing files. In some implementations, if no merge engine is available, control 424 remains "grayed out" even though multiple versions have been selected in window 402.

Control 426 permits the user to save whatever changes have been made (for example, changing which version is considered "current"), while control 428 leaves the version tree unchanged. The latter control may not be available (for example, may be "grayed out") if the user has made irretrievable changes such as were discussed above in connection with "delete version." In addition to the illustrated controls, other controls may be available for other functions. For example, instead of or in addition to the "Delete version" control 420 discussed above, a user may be able to use a "Close version" control (not shown) to disable further branching from a particular version. This function may permit a user to retain access to a deprecated version, for example to permit checking that no content has been lost, without risking the possibility that branches will be created on that portion of the tree. If the user opens a version which has been "closed" in this way, in some implementations, the version might open in a no-editing mode. The file server may also provide a "Search for missing content" function as a control (not shown). Such a function might look through the entire version tree for text passages (or in a sufficiently advanced system, other types of content) that do not appear in the most current version, and provide a list of passages and the version in which they appear. This type of function may facilitate manual checking to resolve different versions of a file without data loss. Other possible controls might include getting a link directly to a specific version and/or sharing a specific version.

Figure 7:
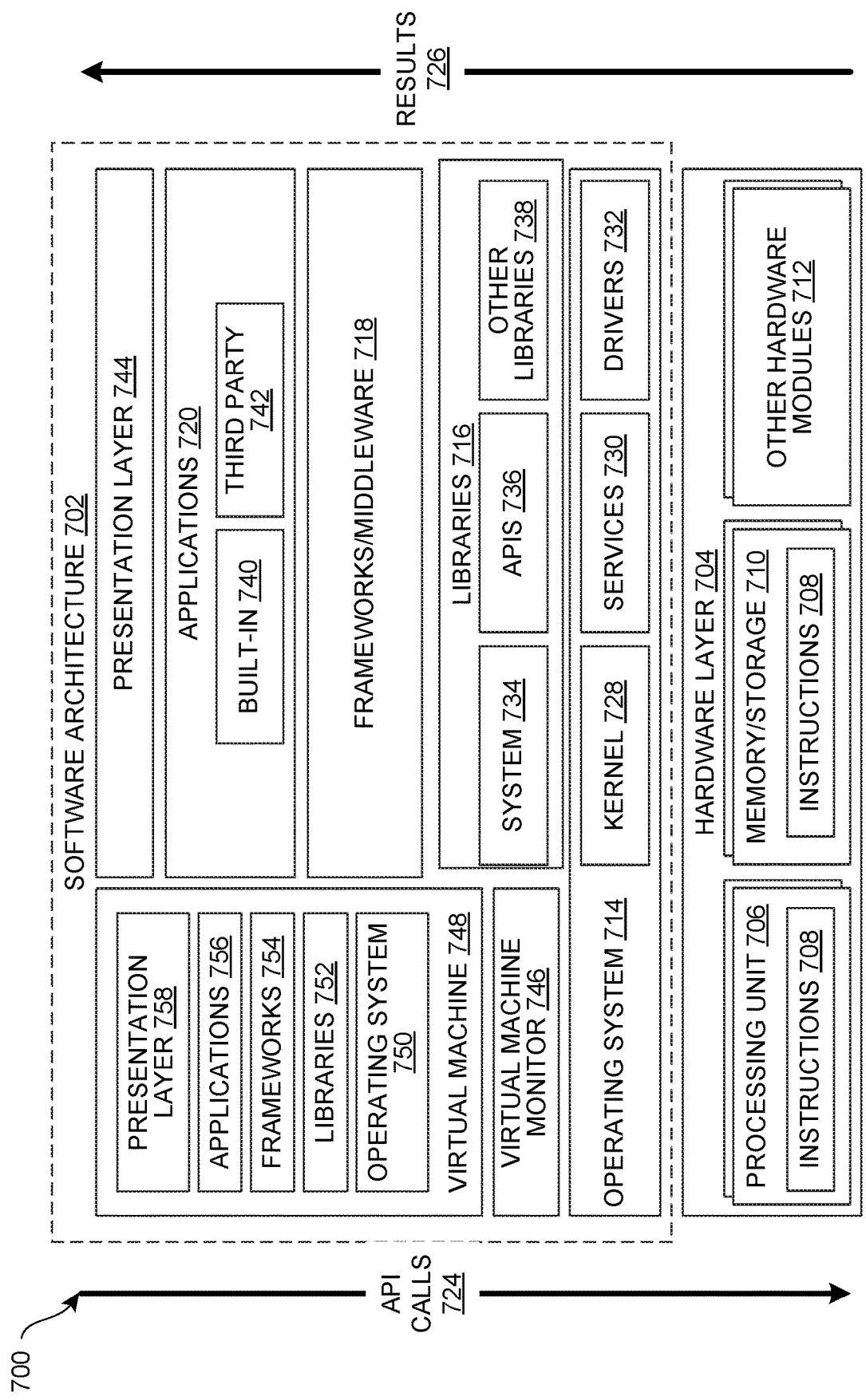
FIG. 7 is a block diagram of an example computing device, which may be used to provide implementations of the systems and methods described herein.

FIG. 7 is a block diagram 700 illustrating an example software architecture 702, various portions of which may be used in conjunction with various hardware architectures herein described, which may implement any of the above-described features. FIG. 7 is a non-limiting example of a software architecture and it will be appreciated that many other architectures may be implemented to facilitate the functionality described herein. The software architecture 702 may execute on hardware that may include, among other things, document storage, processors, memory, and input/output (I/O) components. A representative hardware layer 704 is illustrated and can represent, for example, the devices described herein. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 708 may be portions of instructions 708 held by the memory/storage 710.

The example software architecture 702 may be conceptualized as layers, each providing various functionality. For example, the software architecture 702 may include layers and components such as an operating system (05) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine. The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
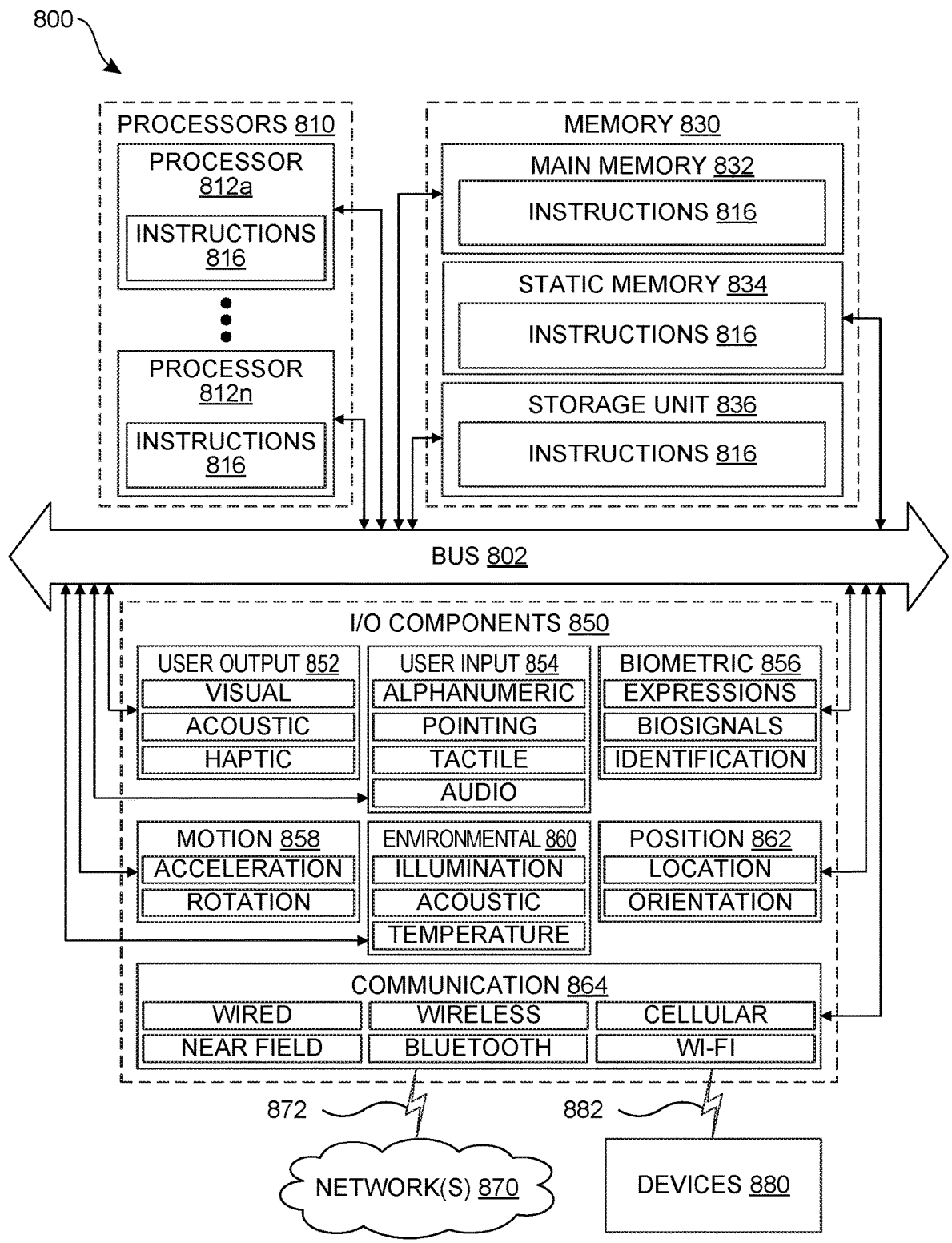
FIG. 8 is a block diagram illustrating components of an example machine configured to read instructions from a machine-readable medium.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion. The term "machine-readable medium," as used herein, does not encompass transitory electrical or electro-magnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856 and/or position components 862, among a wide array of other environmental sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

In the following, further features, characteristics and advantages of the invention will be described by means of items:

Item 1: A file server configured to store multiple versions of a file, including a processor and machine-readable media including instructions. The instructions, when executed by the processor, cause the processor to maintain a version tree for the file, wherein the version tree identifies a designation of one version identifier as a current version of the file, receive a client computer request to save the file, the client computer request including a changed version of the file and a version identifier sent by the file server when the client computer previously opened or saved the file, and, in response to the received client computer request to save the file, store the changed version as a new child version of the file, assign a new version identifier to the new child version of the file, update the version tree to add the new version identifier and to indicate that the new child version of the file is a child of the version corresponding to the version identifier included in the client computer request to save the file, and send to the client computer a confirmation that the file has been changed, wherein the confirmation includes the new version identifier.

Item 2: The file server of item 1, wherein the version tree includes a parent version identifier associated with a parent file, a first child version identifier associated with a first child file, a second child version identifier associated with a second child file, a relationship between the parent version identifier and the first child version identifier indicating that the first child file is a direct child of the parent file, and a relationship between the parent version identifier and the second child version identifier indicating that the second child file is a direct child of the parent file.

Item 3: The file server of item 1 or 2, wherein the machine-readable media further include instructions which, when executed by the processor, cause the processor to, in response to the received client computer request to save the file, update the version tree in the storage to indicate that the current version of the file is the new child version of the file.

Item 4: The file server of any of items 1-3, wherein the machine-readable media further include instructions which, when executed by the processor, cause the processor to, in response to the received client computer request to save the file, if the version identifier sent by the file server when the client computer previously opened or saved the file was not the current version of the file, send the current version of the file to the client computer.

Item 5: The file server of any of items 1-4, wherein the machine-readable media further include instructions which, when executed by the processor, cause the processor to receive a client computer request to view the version tree, and respond to the client computer request to view the version tree by sending the client computer a list of file versions and of relationships between file versions.

Item 6: The file server of any of items 1-5, wherein the machine-readable media further include instructions which, when executed by the processor, cause the processor to receive a client computer request to access a specific file version, and respond to the client computer request to access a specific file version by sending the client computer the requested file version and the version identifier corresponding to the requested file version.

Item 7: The file server of any of items 1-6, wherein the machine-readable media further include instructions which, when executed by the processor, cause the processor to receive a client computer request to designate a specific file version as the current version, and respond to the received client computer request by updating the version tree to identify the designated specific file version as the current version.

Item 8: A file server configured to store multiple versions of a file, including a processor and machine-readable media including instructions. The instructions, when executed by the processor, cause the processor to maintain a version tree for the file, wherein the version tree identifies a designation of one version as the current version of the file, to respond to a request from a client computer to open the file by returning the file and a version identifier corresponding to the current version of the file, to respond to a request from a client computer to save the file, the request to save the file including a version identifier previously received from the file server, by comparing the version identifier previously received from the file server with the version identifier corresponding to current version of the file, and, if the version identifier previously received from the file server does not match the version identifier corresponding to current version of the file, responding to the request to the client computer by providing the version identifier corresponding to current version of the file, and accepting instructions from the client computer on saving the file.

Item 9: The file server of item 8, wherein the machine-readable media further include instructions which, when executed by the processor, cause the processor to perform the step of accepting instructions from the client computer on saving the file by accepting an instruction to upload a version of the file from the client computer and update the version tree to indicate that the uploaded version of the file is a child of the version identified by the client computer, or to upload a version of the file from the client computer and store it as a version of a new file having a new version tree, wherein the new version tree indicates that the new file is the only version of the new file.

Item 10: The file server of item 8 or 9, wherein the new version tree includes a pointer to the version tree for the file.

Item 11: The file server of any of items 8-10, wherein the machine-readable media further include instructions which, when executed by the processor, cause the processor to, if the version identifier previously received from the file server matches the version identifier corresponding to current version of the file, respond to the request to the client computer by storing a new version of the file received from the client computer, assigning a new version identifier to the stored new version of the file, updating the version tree to add the new version identifier as a child of the current version identifier and then setting the current version of the file to be the new version identifier, and sending the new version identifier to the client computer.

Item 12: A method of maintaining multiple versions of a file on a file server, the method including saving a version tree structure to non-volatile storage, receiving from a client computer a request to open the file, responding to the request to open the file by serving to the client computer a current version identifier and the version of the file corresponding to the current version identifier, receiving from a client computer a request to save the file, the request including a version of the file to be saved and a version identifier received from the file server, and responding to the request to save the file by saving the file on the file server as a child of the version identifier received from the client computer, creating a new version identifier and assigning it to correspond to the saved file, and sending an acknowledgement to the client computer including the new version identifier.

Item 13: The method of item 12, wherein the version tree structure includes a parent version of the file and a corresponding parent version identifier; a first child version of the file a corresponding first child version identifier, wherein the first child version of the file is a direct child of the parent version of the file; a second child version of the file and a corresponding second child version identifier, wherein the second child version of the file is a direct child of the parent version of the file; and a current version identifier.

Item 14: The method of item 12 or 13, wherein responding to the request to save the file further includes setting the current version identifier to be the new version identifier.

Item 15: The method of any of items 12-14, further including receiving a request to save a new file from a client computer, and, in response to the request, saving the new file on the file server, creating a version tree for the new file, wherein the version tree includes a new version identifier for the saved file and a current version identifier for the saved file equal to the new version identifier of the saved file, and sending an acknowledgement to the client computer including the new version identifier of the saved file.

Item 16: The method of any of items 12-15, further including receiving a client computer request to view the version tree, and responding to the client computer request to view the version tree by sending the client computer a list of file versions and of relationships between file versions.

Item 17: The method of any of items 12-16, wherein the list of file versions and of relationships between file versions further includes an identification of a user who created at least one file version.

Item 18: The method of any of items 12-17, wherein the list of file versions and of relationships between file versions further includes a comparison of changed elements between file versions.

Item 19: The method of any of items 12-18, further including receiving a client computer request to open a specific file version, and responding to the client computer request to open a specific file version by sending the client computer the requested file version and the version identifier corresponding to the requested file version.

Item 20: The method of any of items 12-19, further including receiving a client computer request to designate a specific file version as the current version, and responding to the received client computer request by updating the version tree to identify the designated specific file version as the current version.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A file server configured to store multiple versions of a file, comprising:
   a processor; and
   machine-readable media including instructions which, when executed by the processor, cause the processor to:
      maintain a version tree for the file, wherein the version tree identifies a designation of one version identifier as a current version of the file, and wherein each node in the version tree identifies a different version of the file;
      receive a client computer request to save the file, the client computer request including a changed version of the file and a version identifier sent by the file server when the client computer previously opened or saved the file; and
      in response to the received client computer request to save the file:
         store the changed version as a new child version of the file;
         assign a new version identifier to the new child version of the file;
         update the version tree to add the new version identifier and to indicate that the new child version of the file is a child of the version corresponding to the version identifier included in the client computer request to save the file; and
         send to the client computer a confirmation that the file has been changed, wherein the confirmation includes the new version identifier.

2. The file server of claim 1, wherein the version tree includes:
   a parent version identifier associated with a parent file;
   a first child version identifier associated with a first child file;
   a second child version identifier associated with a second child file;
   a relationship between the parent version identifier and the first child version identifier indicating that the first child file is a direct child of the parent file; and
   a relationship between the parent version identifier and the second child version identifier indicating that the second child file is a direct child of the parent file.

3. The file server of claim 2, wherein the machine-readable media further comprise instructions which, when executed by the processor, cause the processor to:
   in response to the received client computer request to save the file, update the version tree in the storage to indicate that the current version of the file is the new child version of the file.

4. The file server of claim 1, wherein the machine-readable media further comprise instructions which, when executed by the processor, cause the processor to:
   in response to the received client computer request to save the file:
      if the version identifier sent by the file server when the client computer previously opened or saved the file was not the current version of the file, send the current version of the file to the client computer.

5. The file server of claim 1, wherein the machine-readable media further comprise instructions which, when executed by the processor, cause the processor to:
   receive a client computer request to view the version tree; and
   respond to the client computer request to view the version tree by sending the client computer a list of file versions and of relationships between file versions.

6. The file server of claim 5, wherein the machine-readable media further comprise instruction which, when executed by the processor, cause the processor to:
   receive a client computer request to access a specific file version; and
   respond to the client computer request to access a specific file version by sending the client computer the requested file version and the version identifier corresponding to the requested file version.

7. The file server of claim 5, wherein the machine-readable media further comprise instruction which, when executed by the processor, cause the processor to:
   receive a client computer request to designate a specific file version as the current version; and
   respond to the received client computer request by updating the version tree to identify the designated specific file version as the current version.

8. A file server configured to store multiple versions of a file, comprising:
   a processor; and
   machine-readable media including instructions which, when executed by the processor, cause the processor to:
      maintain a version tree for the file, wherein the version tree identifies a designation of one version identifier as a current version of the file, and wherein each node in the version tree identifies a different version of the file;

respond to a request from a client computer to open the file by returning the file and a version identifier corresponding to the current version of the file;

respond to a request from a client computer to save the file, the request to save the file including a version identifier previously received from the file server, by:

comparing the version identifier previously received from the file server with the version identifier corresponding to current version of the file; and if the version identifier previously received from the file server does not match the version identifier corresponding to current version of the file:

responding to the request to the client computer by providing the version identifier corresponding to current version of the file; and accepting instructions from the client computer on saving the file.

9. The file server of claim 8, wherein the machine-readable media further include instructions which, when executed by the processor, cause the processor to perform a step of accepting instructions from the client computer on saving the file by:

accepting an instruction to:

upload a version of the file from the client computer and update the version tree to indicate that the uploaded version of the file is a child of the version identified by the client computer; or upload a version of the file from the client computer and store it as a version of a new file having a new version tree, wherein the new version tree indicates that the new file is an only version of the new file.

10. The file server of claim 9, wherein the new version tree includes a pointer to the version tree for the file.

11. The file server of claim 8, wherein the machine-readable media further include instructions which, when executed by the processor, cause the processor to, if the version identifier previously received from the file server matches the version identifier corresponding to current version of the file:

respond to the request from the client computer by:

storing a new version of the file received from the client computer;

assigning a new version identifier to the stored new version of the file;

updating the version tree to add the new version identifier as a child of the current version identifier and then setting the current version of the file to be the new version identifier; and sending the new version identifier to the client computer.

12. A method of maintaining multiple versions of a file on a file server, the method comprising:

saving a version tree structure to non-volatile storage, the version tree structure including a version tree for the file, wherein the version tree identifies a designation of one version identifier as a current version identifier of the file, and wherein each node in the version tree identifies a different version of the file;

receiving from a client computer a request to open the file;

responding to the request to open the file by serving to the client computer the current version identifier and the version of the file corresponding to the current version identifier;

receiving from a client computer a request to save the file, the request including a version of the file to be saved and a version identifier received from the file server; and responding to the request to save the file by:

saving the file on the file server as a new child version of the version of the file corresponding to the current version identifier;

creating a new version identifier and assigning it to correspond to the saved file and save the new version identifier in the version tree as a child of the current version identifier; and sending an acknowledgement to the client computer including the new version identifier.

13. The method of claim 12, wherein the version tree structure includes:

a parent version of the file and a corresponding parent version identifier;

a first child version of the file a corresponding first child version identifier, wherein the first child version of the file is a direct child of the parent version of the file; and a second child version of the file and a corresponding second child version identifier, wherein the second child version of the file is a direct child of the parent version of the file.

14. The method of claim 12, wherein responding to the request to save the file further includes setting the current version identifier to be the new version identifier.

15. The method of claim 12, further comprising:

receiving a request to save a new file from a client computer; and in response to the request, saving the new file on the file server;

creating a version tree for the new file, wherein the version tree for the new file includes a new version identifier for the saved file and a current version identifier for the saved file equal to the new version identifier of the saved file; and sending an acknowledgement to the client computer including the new version identifier of the saved file.

16. The method of claim 12, further comprising:

receiving a client computer request to view the version tree; and responding to the client computer request to view the version tree by sending the client computer a list of file versions and of relationships between file versions.

17. The method of claim 16, wherein the list of file versions and of relationships between file versions further includes an identification of a user who created at least one file version.

18. The method of claim 16, wherein the list of file versions and of relationships between file versions further includes a comparison of changed elements between file versions.

19. The method of claim 16, further comprising:

receiving a client computer request to open a specific file version; and responding to the client computer request to open a specific file version by sending the client computer the requested file version and the version identifier corresponding to the requested file version.

20. The method of claim 16, further comprising:

receiving a client computer request to designate a specific file version as the current version; and responding to the received client computer request by updating the version tree to identify the designated specific file version as the current version.

\* \* \* \* \*